United States Patent [19]

Miyamoto et al.

[11] Patent Number: 5,914,198
[45] Date of Patent: Jun. 22, 1999

[54] MAGNETO-OPTICAL RECORDING MEDIUM HAVING DIELECTRIC LAYERS WITH DIFFERENT INDICES OF REFRACTION

[75] Inventors: Harukazu Miyamoto, Hachioji; Toshio Niihara, Sayama; Norio Ohta, Ibaraki-ken; Fumiyoshi Kirino, Tokyo, all of Japan

[73] Assignees: Hitachi, Ltd., Tokyo; Hitachi Maxell, Ltd., Osaka, both of Japan

[21] Appl. No.: 08/831,262

[22] Filed: Apr. 7, 1997

Related U.S. Application Data

[63] Continuation-in-part of application No. 07/432,002, Nov. 6, 1989, abandoned, and application No. 08/396,371, Feb. 28, 1995, abandoned, which is a continuation of application No. 07/533,312, Jun. 5, 1990, abandoned.

[30] Foreign Application Priority Data

Jun. 5, 1989 [JP] Japan ..................................... 1-141038

[51] Int. Cl.$^6$ ...................................................... G11B 5/66
[52] U.S. Cl. ........................... 428/694 ML; 428/694 DE; 428/694 RL; 428/694 XS; 428/694 NF; 428/900; 369/13
[58] Field of Search ........................ 369/13; 428/694 ML, 428/694 DE, 694 RL, 694 XS, 694 NF

[56] References Cited

U.S. PATENT DOCUMENTS

| | | | |
|---|---|---|---|
| 4,466,035 | 8/1984 | Connell et al. | 360/114 |
| 4,717,628 | 1/1988 | Takahashi et al. | 428/457 |
| 4,786,559 | 11/1988 | Murakami et al. | 428/472 |
| 4,838,962 | 6/1989 | Takayama et al. | 148/304 |
| 5,175,715 | 12/1992 | Moon | 369/13 |

FOREIGN PATENT DOCUMENTS

| | | |
|---|---|---|
| 0135322 | 7/1984 | European Pat. Off. . |
| 0139474 | 9/1984 | European Pat. Off. . |
| 161807 | 11/1985 | European Pat. Off. . |
| 0192256 | 2/1986 | European Pat. Off. . |
| 192256 | 8/1986 | European Pat. Off. . |
| 233034 | 8/1987 | European Pat. Off. . |
| 318337A2 | 5/1989 | European Pat. Off. . |
| 298612 | 12/1989 | European Pat. Off. . |
| 387420A2 | 9/1990 | European Pat. Off. . |
| 3623285 A1 | 1/1987 | Germany . |
| 62-137743 | 6/1987 | Japan . |
| 293541 | 12/1987 | Japan . |

OTHER PUBLICATIONS

Maeno et al., "Magnetooptical Memory Using BaTiON protective films", Oct. 1990, J. Appl. Phys. 68 (8), p. 4325.
Patent Abstracts of Japan, vol. 12, No. 188 (P–711)[3035], JP–A–62–295–238, Feb. 6, 1988, Japan.
Patent Abstracts of Japan, vol. 12, No. 185 (P–710) [3032] JP–A–62–293–539 May 31, 1988, Japan.
Patent Abstracts of Japan, vol. 6, No. 84 (P–117) [962] JP–A–57–20–933 May 22, 1982, Japan.
Patent Abstracts of Japan, vol. 12, No. 309 (P–748) [3156] JP–A–63–78–357 Aug. 23, 1988, Japan.
Patent Abstracts of Japan, vol. 12, No. 185 (P–710) [3032] JP–A–62–293–541 May 31, 1988, Japan.

*Primary Examiner*—Leszek Kiliman
*Attorney, Agent, or Firm*—Pennie & Edmonds LLP

[57] ABSTRACT

In a magneto-optical recording medium which comprises a transparent substrate, a first dielectric film, a magnetic film, a second dielectric film and a metal reflective film, formed successively one upon another, Kerr rotation angle can be increased without lowering the reflectivity by setting the thickness of the first dielectric film to 120–220% of a minimum film thickness among film thicknesses showing a minimum reflectivity and setting the thickness of the second dielectric film to 80–120% of a film thickness showing a maximum Kerr rotation angle and furthermore by making the refractive index of the first dielectric film lower than that of the second dielectric film.

2 Claims, 2 Drawing Sheets

MAGNETO-OPTICAL RECORDING MEDIUM HAVING DIELECTRIC LAYERS WITH DIFFERENT INDICES OF REFRACTION

This is a continuation-in-part application of U.S. patent application Ser. No. 07/432,002, filed Nov. 6, 1988, now abandoned, the disclosure of which is hereby incorporated by reference.

This is also a continuation of application Ser. No. 08/396, 371, filed Feb. 28, 1995, now abandoned; which is continuation of application Ser. No. 07/533,312, filed Jun. 5, 1990 now abandoned.

BACKGROUND OF THE INVENTION

1) Field of the Invention

This invention relates to a magneto-optical recording medium capable of writing, reading-out, erasing, etc. of information by irradiation with light such as laser beam, etc.

2) Prior Art

Magneto-optical recording has been recently regarded as an important means for information-rewritable optical disks, and rare earth-transition metal alloy films have been used for the optical disk recording media. However, the Kerr rotation angle of the rare earth-transition metal alloy films is as low as 0.3–0.40 as such and the methods for increasing the Kerr rotation angle by utilizing the light interference have been so far investigated.

FIGS. 4 and 5 are cross-sectional vertical views of magneto-optical recording media utilizing conventional methods for increasing the Kerr rotation angle.

In FIG. 5, light 6 incoming from the side of a transparent substrate 1 is reflected on the interface between a dielectric film 11 and a magnetic film 3 to cause a Kerr rotation. The light is reflected at the interface between the dielectric film 11 and the substrate 1, and again reflected on the magnetic film 11 to cause a Kerr rotation. By repetitions of multi-reflection in the dielectric film 11, the Kerr rotation angle is increased. However, the magnetic film absorbs a portion of the light without reflection, and thus the absorbance is also increased together with the increase in the Kerr rotation angle, resulting in a decrease in the reflectivity.

In case of the structure shown in FIG. 4, Faraday rotation effect of light passing through a magnetic film 3 and rotation of polarization plane by the multi-reflection in a second dielectric film 4 are added to the multi-reflection in a first dielectric film 2 as above, whereby the Kerr rotation angle is further increased, but the reflectivity is decreased.

In these two structures, an increase in the Kerr rotation and a decrease in the reflectivity take place at the same time, but a figure of merit F, i.e. a quantity proportional to a S/N (signal/noise) ratio of a medium, can be increased. When R is a reflectivity and $\theta_k$ is a Kerr rotation angle, the figure of merit F can be given by:

$$R^{\alpha} \cdot \theta_k, \text{ where } \alpha = \frac{1}{2} \text{ or } 1.$$

Prior art examples relating to the aforementioned methods are shown in Japanese Patent Applications Kokai (Laid-open) Nos. 61-17236, 59-152552, 57-16996, 60-63747, etc.

Japanese Patent Applications Kokai (Laid-open) Nos. 57-169996 and 60-63747 propose to make the refractive index of the first dielectric film 2 higher than that of the second dielectric film 4, as shown in FIG. 4. That is, it is proposed to increase the Kerr rotation angle by the multi-interference in the first dielectric film 2 and lower the refractive index of the second dielectric film 4, thereby making the apparent refractivity as a synthetic of those of a reflecting film 5 and the second dielectric film 4 approach to zero, thereby to increase the reflectivity.

In case of utilizing the interference in the first dielectric film 2, the Kerr rotation angle can be indeed increased, but the reflectivity is considerably lowered at the same time, and the figure of merit for read-out, $F=R^{\alpha} \cdot \theta_k$, where $\alpha=1$ when the intensity of reflection is small, cannot be increased too much. Furthermore, the thickness of the first dielectric film 2 is fixed by conditions for maximum Kerr rotation angle and the thickness cannot be made larger, and the protection from corrosions due to oxidation, etc. of the magnetic film 3 cannot be improved. Still furthermore, the thickness of the first dielectric film 2 satisfying the conditions for maximum Kerr rotation angle becomes inevitably smaller, because of the larger refractive index of the first dielectric film 2.

In order to further increase the figure of merit in the structures shown in FIGS. 4 and 5, the reflectivity must be decreased, as explained above. Furthermore, the reflectivity is also utilized in the tracking or auto-focusing, and thus some intensity of reflection is required.

It is desirable from the viewpoint of corrosion resistance that the dielectric film 1 has a larger thickness, but the film thickness is restricted by the figure of merit in the prior art examples.

SUMMARY OF THE INVENTION

An object of the present invention is to provide a magneto-optical recording medium capable of increasing the Kerr rotation angle without lowering the reflectivity and with good write-read characteristics.

Another object of the present invention is to provide a magneto-optical recording medium with a considerably improved corrosion resistance together with good write-read characteristics.

DETAILED DESCRIPTION OF THE INVENTION

Figure 1:
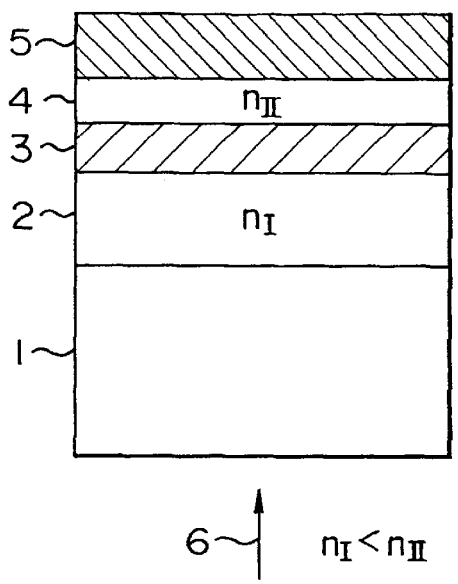
FIGS. 1, 6 and 7 are cross-sectional vertical views each showing structures of magneto-optical recording media according to embodiments of the present invention.

The first object of the present invention can be attained by making the refractive index of the dielectric film 2 lower than that of a dielectric film 4, whereby the intensity of reflection at the interface between the dielectric film 2 and the magnetic film 3 can be made always larger than that at the interface between the dielectric film 4 and the magnetic film 3, and thus the Kerr rotation at the former interface can be made larger than that at the latter interface, as shown in FIG. 1. Since the Kerr rotation at the latter interface is opposite in the polarity to that at the former interface, there has been a fear of offsetting these two effects, but such a fear can be overcome in the present invention.

The Fresnel reflection coefficients depend on both the absolute value in the difference in refractive indices of the materials of the two layers at an interface and the ratio of the absolute value of the difference to the sum of the indices of refraction. When a difference in the refractive index between the magnetic film and the dielectric film 2 is larger than that in the refractive index between the magnetic film and the dielectric film 4, the intensity of reflection at the former interface is always higher than that at the latter interface, and thus a very large Kerr rotation angle can be obtained.

The second object of the present invention can be attained by setting the thickness of the dielectric film 2 to 80–120% of a film thickness showing a maximum Kerr rotation angle and the thickness of the dielectric film 4 to 120–220% of a minimum film thickness among film thicknesses showing a minimum reflectivity. Particularly when the thickness of the dielectric film 4 is set to 160–200% of a minimum film thickness among film thicknesses showing a minimum reflectivity, the reflectivity shows a substantially maximum value.

The second dielectric film 4 and the metallic film 5 have functions to reflect the light passed through the magnetic film 3 and increase the Kerr rotation angle by interference and the Faraday rotation angle in the magnetic film 3. The first dielectric film 2 has a function to increase the intensity of reflection by multi-interference. The reflectivity decreased by the second dielectric film 4 can be supplemented by the first dielectric film 2 owing to these functions, and thus the Kerr rotation angle can be increased without any decrease in the intensity of reflection. At that time, the thickness of the first dielectric film 2 is larger than that of the conventional one, and the larger thickness has a function to improve the effect on the prevention of the magnetic film 3 from oxidation. A magneto-optical recording medium with good write-read characteristics and a higher reliability can be obtained thereby.

In other words, a value obtained by adding a product of the thickness of the magnetic film 3 multiplied by its refractive index to a product of the thickness of the second dielectric film 4 multiplied by its refractive index, that is, the sum total of the optical length of the second dielectric film 4 and that of the magnetic film 3 is about one-fourth of the wavelength of the irradiation light, and thus the two films in total act as a kind of anti-reflective layer, and the effective number of reciprocal movement of the irradiation light within the magnetic film by multi-reflection is increased and thus the Faraday rotation effect is increased, resulting in an apparent increase in the Kerr rotation angle.

The product of the thickness of the first dielectric film 2 multiplied by its refractive index is about one-half of the wavelength of the irradiation light, and thus the first dielectric film 2 acts as the so-called reflective film and the intensity of reflection can be increased by interference. Thus, with the structure of the present invention, the Kerr rotation angle can be increased in the second dielectric film 4 and the intensity of reflection can be increased in the first dielectric film 2.

Figure 2:
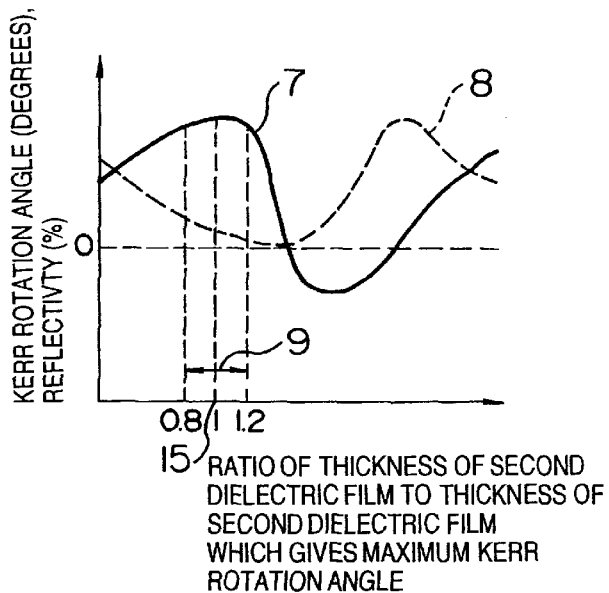
FIGS. 2 and 3 are diagrams showing correlations between the thickness of first and second dielectric films, respectively, and the Kerr rotation angle or the reflectivity.

In the present invention, the thickness of the second dielectric film 4 has a large influence upon the Kerr rotation angle 7, as shown in FIG. 2. So long as the thickness of the second dielectric film 4 is set to 80–120% of the film thickness 15 of the second dielectric film 4 showing a maximum Kerr rotation angle, a thoroughly large Kerr rotation angle 7 can be obtained, as shown in FIG. 2, and thus the effect of the present invention can be obtained. The thickness of the second dielectric film 4 may be smaller than 80% of the film thickness 15 showing the maximum Kerr rotation angle only from the viewpoint of Kerr rotation angle 7, but 80% is a lower limit to the film thickness from the viewpoint of medium corrosion resistance.

Figure 3:
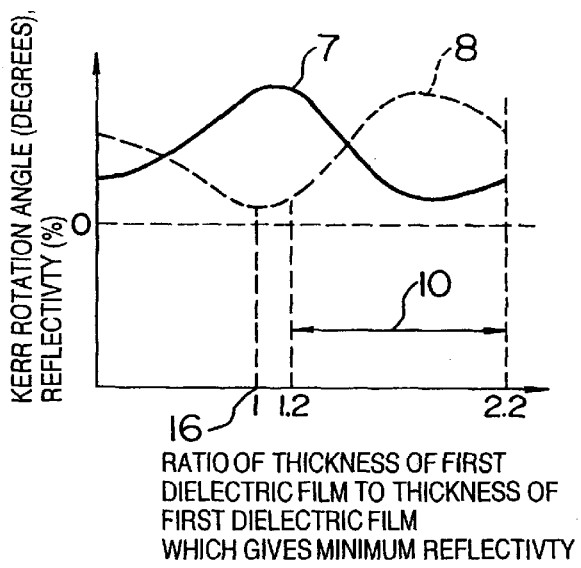
Figure 4:
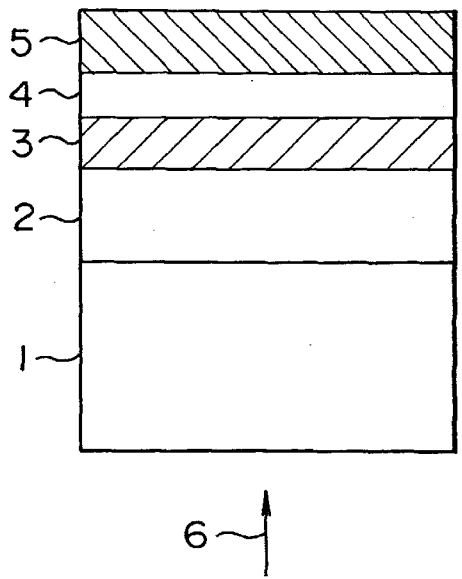
FIGS. 4 and 5 are cross-sectional vertical views each showing structures of conventional magneto-optical recording media.
Figure 5:
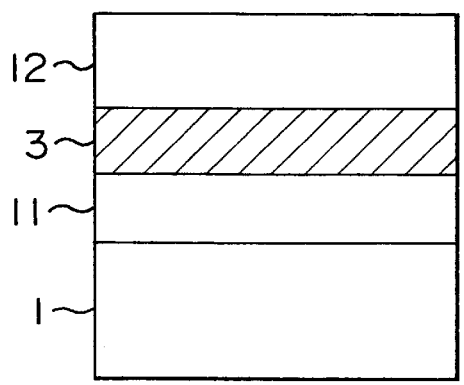

As shown in FIG. 3, the Kerr rotation angle 7 never shows a maximum when the first dielectric film 2 having a film thickness showing a minimum reflectivity 8 is used. The peak of Kerr rotation angle 7 is shifted toward the larger film thickness side, and thus the figure of merit F amounts to a larger value when the thickness of the first dielectric film 2 is set to 120–220% of the film thickness showing a minimum reflectivity in 8. When the film thickness exceeds 220%, the figure of merit F is decreased to the contrary. Thus, the thickness of the first dielectric film 2 must be set to 120 to 220% of the film thickness showing a mimimum reflectivity.

When sum total of the optical length of the second dielectric film 4 and that of the magnetic film 3 is about one-fourth of the wavelength of irradiation light, the light interference between the interface between the first dielectric film 5 and the magnetic film 3 and the metal reflective film 5 becomes a maximum. Thus the Kerr rotation angle becomes a maximum. When the sum total of the optical lengths is one-half of the wavelength of irradiation light, the Kerr rotation angle becomes zero, and thus in order to obtain the effect of the present invention it is necessary that the sum total of the optical lengths is $\frac{1}{8}$ to $\frac{3}{8}$ of the wavelength of irradiation light.

When the optical length of the first dielectric film 2 is about one-fourth of the wavelength of irradiation light, a minimum reflectivity can be obtained. When the optical length is about one-half of the wavelength of irradiation light, a maximum reflectivity can be obtained. Thus, in order to obtain a higher reflectivity, the optical path length of the first dielectric film 2 must be $\frac{3}{8}$ to $\frac{5}{8}$ of the wavelength of irradiation light.

PREFERRED EMBODIMENTS OF THE INVENTION

EXAMPLE B

In FIG. 1, a polycarbonate substrate 1 prepared by injection molding had V-shaped tracking grooves at pitches of 1.6 $\mu$m. The polycarbonate substrate 1 was kept in vacuum at 80° C. for 3 hours to carry out dehydration treatment to remove moistures contained in the substrate. The resulting polycarbonate 1 had a refractive index $n_2$ of 1.5.

Then, the polycarbonate substrate 1 was placed in a radio frequency magnetron sputtering apparatus, and after evacuation of the vacuum chamber to less than $8 \times 10^{-7}$ Torr, an Ar gas and a $N_2$ gas were introduced into the vacuum chamber and the polycarbonate substrate 1 was sputtered with a sintered SiN target under a gas pressure of $1 \times 10^{-2}$ Torr to form a SiN film as a first dielectric film 2 only to a thickness of 1,000 Å on the polycarbonate substrate 1. At that time, it was desirable to subject the surface of polycarbonate substrate 1 to sputter-etching in advance. The thus formed SiN film having a thickness of 1,000 Å had a refractive index $n_f$ of 2.0.

Then, after the similar evacuation of the vacuum chamber, an Ar gas was introduced into the vacuum chamber, the polycarbonate substrate 1 with the SiN film 2 was sputtered with a TbFeCo alloy target under a gas pressure of $5 \times 10^{-3}$ Torr to form a TbFeCo magnetic film 3 having a refractive index nr of 3.0 only to a thickness of 200 Å on the SiN film 2.

Then, after the similar evacuation of the vacuum chamber, an Ar gas was introduced into the vacuum chamber and the polycarbonate substrate with the SiN film 2 and the TbFeCo magnetic film 3 was sputtered with a sintered SiN target under a gas pressure of $1\times10^{-2}$ Torr to form a SiN film to a thickness of 300 Å as a second dielectric film 4 on the TbFeCo magnetic film 3. The second SiN dielectric film 4 had a refractive index $n_{II}$ of 2.2. After the similar evacuation of the vacuum chamber, an Ar gas was introduced into the vacuum chamber and the polycarbonate substrate 1 with the foregoing three films was sputtered with an Al-Ti alloy target under a gas pressure of $3\times10^{-3}$ Torr to form an Al-Ti alloy film having a refractive index nm of 2.0 to a thickness of 500 Å as a metal film 5 on the second SiN dielectric film 4.

Figure 6:
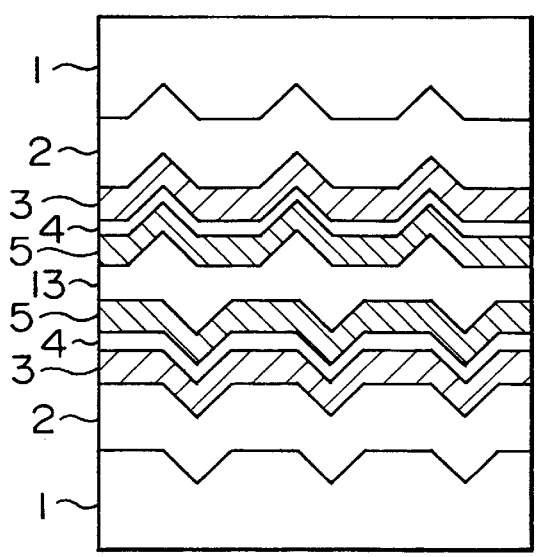

The thus sputtered polycarbonate substrate 1 with the four films was taken out of the vacuum chamber and then subjected to an initialization by applying a magnetic field of 20 kOe to the substrate in the perpendicular direction to the film surface. Then, the polycarbonate substrate 1 was pasted with another polycarbonate substrate 1 with the likewise formed films by an adhesive so that the metal film of the first polycarbonate substrate can be brought into contact with the metal film of the second polycarbonate film to obtain a magneto-optical recording medium in the structure shown in FIG. 6.

The thus prepared magneto-optical recording medium satisfied such a condition as $n_S<n_f<n_{II}<n_r$, $n_m<n_{II}$ and as shown by Example B in Table the reflectivity was 24%, Kerr rotation angle was 0.75° and figure of merit $R \cdot \theta_k$ was 0.18°, which was about 1.4 times as large as that of conventional ones (Conventional Examples 1 and 2).

TABLE

| | Reflectivity (%) | Kerr rotation angle (degree) | $R \cdot \theta_k$ (degree) |
|---|---|---|---|
| Prior art Example 1 | 24 | 0.55 | 0.13 |
| Prior art Example 2 | 12 | 1.2 | 0.14 |
| Example A | 27 | 0.60 | 0.16 |
| Example B | 24 | 0.75 | 0.18 |
| Example C | 20 | 0.95 | 0.18 |

In the present invention, the thickness of the second dielectric film 4 was set to show a maximum Kerr rotation angle, as shown in FIG. 2. With this film thickness the interference reached a maximum by multi-reflection of irradiation light in the second dielectric film 4 and the magnetic film 3, and the Kerr rotation angle of reflection reached a maximum.

As shown in FIG. 3, the thickness of the first dielectric film 2 is set approximately to a film thickness showing a maximum reflection.

With this structure the Kerr rotation angle can be increased without lowering the reflectivity. On the other hand, when the thickness of the first dielectric film 2 is set to a film thickness showing a maximum Kerr rotation angle and when the thickness of the second dielectric film 4 is set to a film thickness showing a maximum reflectivity, the above-mentioned effect cannot be obtained, because, as shown in FIG. 3, the figure of merit $R \cdot \theta_k$, a product of the Kerr rotation angle multiplied by the reflectivity, is not substantially changed even if the thickness of the first dielectric film 2 is changed, but when the thickness of the second dielectric film 4 is changed, the figure of merit is largely changed. Physically, the interference by the second dielectric film 4 is due to the double effect of Kerr rotation of reflection by the magnetic film and Faraday effect of irradiation light passing through the magnetic film, and thus there are such film thicknesses as to mutually intensify these two effects and such film thicknesses as to mutually weaken the effects to the contrary.

EXAMPLE C

Figure 7:
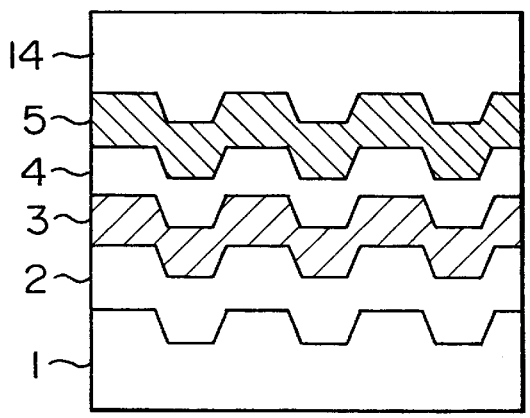

In FIG. 7, a chemical-reinforced glass substrate 1 having U-shaped tracking grooves and a refractive index $n_s$ of 1.5 was placed in a radio frequency magnetron sputtering apparatus, and after evacuation of the vacuum chamber to less than $8\times10^{-7}$ Torr, a mixture of Ar gas and $O_2$ gas was introduced into the vacuum chamber, and the glass substrate 1 was sputtered under a gas pressure of $1\times10^{-2}$ Torr with a sintered $ZrO_2$ target to form a $ZrO_2$ film to a thickness of 900 Å as a first dielectric film 2 on the glass substrate 1. The $ZrO_2$ film 2 had a refractive index $n_f$ of 2.2.

After the similar evacuation of the vacuum chamber, an Ar gas was introduced into the vacuum chamber, the glass substrate 1 with the $ZrO_2$ film 2 was sputtered under a gas pressure of $5\times10^{-3}$ Torr with a TbFeCo alloy target to form a TbFeCo magnetic film 3 having a refractive index nr of 3.0 only to a thickness of 200 Å on the $ZrO_2$ film 2. Then, after the similar evacuation of the vacuum chamber, the glass substrate 1 with these two films 2 and 3 was sputtered under an Ar gas pressure of $2\times10^{-2}$ Torr with a sintered ZnS target to form a ZnS film to a thickness of 250 Å as a second dielectric film 4 on the TbFeCo magnetic film 3. The film 4 had a refractive index $n_{11}$ of 2.4.

Then, after the similar evacuation of the vacuum chamber, an Ar gas was introduced into the vacuum chamber and the glass substrate with the three film 2, 3 and 4 was sputtered under a gas pressure of $3\times10^{-3}$ Torr with an Al target to form a metal film 5 on the ZnS film 4. The Al film 5 had a thickness of 300 Å and a refractive index nm of 2.0.

The thus prepared disk with the four films was taken out of the vacuum chamber and subjected to initialization by applying a magnetic field of 20 kOe to the substrate in the perpendicular direction to the film surface. Then, an ultraviolet light-curing resin (UV resin) was spin coated thereon as a protective coating 14 and exposed to an ultraviolet light in vacuum for one minute to cure the resin. The protective coating 14 has a function to protect the recording film from damages by crushes of a floating type magnetic head slider and also has an effect on the corrosion resistance improvement of the recording film.

EXAMPLE A

Static characteristics of the thus prepared magneto-optical recording medium is shown in Table as Example C. By properly changing the thickness of the first dielectric film 2 and that of the second dielectric film 4, media having the static characteristics shown in Table as Examples A and B could be prepared.

When a modulation magnetic field was applied to the magneto-optical recording medium having the characteristics shown as Example C by a floating type magnetic head to evaluate the write-read characteristics, it was found that the C/N (carrier-to-noise) ratio was 60 dB.

Figure 8:
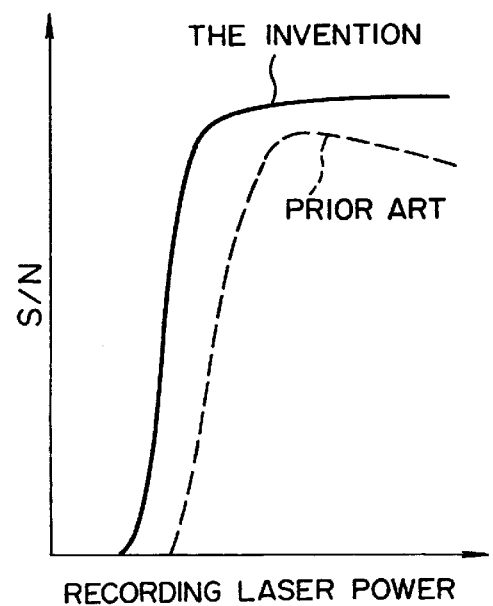
FIG. 8 is a diagram showing the correlation between the recording laser power and S/N, which shows the effect of the present invention.

FIG. 8 shows write-read characteristics of the present magneto-optical recording medium. With increasing figure of merit, the C/N ratio was considerably increased in the present invention, as compared with the conventional example, and also the recording sensitivity was also improved.

The film structure of the present magneto-optical recording medium is not limited to those disclosed in the foregoing Examples, but the following structures are also possible.

(1) Oxides such as SiO, $Ta_2O_5$, etc., nitrides such as TaN, SiN, etc., and sulfide such as CdS, etc. can be used for the first dielectric film 2 and the second dielectric film 4.

(2) Al, Cu, Ag, Au, Ti, Ni, Cr, stainless steel or their alloys can be used for the metal film 5.

(3) Acrylate, ultraviolet-curable resin, polyolefin, etc. can be used for the substrate 1.

(4) Amorphous alloys of rare earth elements and transition metals such as Tb—Fe, Gd—Tb—Fe, Dy—Fe—Co, etc., or amorphous alloys further containing at least one of corrosion resistance-improving elements such as Ti, Ta, Cr, V, Nb, etc. can be used for the magnetic film 3.

Magneto-optical recording of the present magneto-optical recording medium can be carried out by changing the intensity of a laser beam or by changing the magnetic film intensity while keeping the intensity of the laser beam constant.

As described in detail above, the Kerr rotation angle can be increased without any reduction in the reflectivity in the present invention, because the thickness of a first dielectric film 2 formed on a substrate 1 is set to 120–220% of the minimum film thickness among the thicknesses showing a minimum reflectivity and furthermore the thickness of a second dielectric film 4 formed on a magnetic film 3 thereon is set to 80–120% of the film thickness showing a maximum Kerr rotation angle, and further because the refractive index of the first dielectric film 2 is lower than that of the second dielectric film. The effect of the present invention can be more pronounced by setting the thickness of the first dielectric film to 160–200% of the minimum film thickness among the film thickness showing a minimum reflectivity.

What is claimed is:

1. A magneto-optical recording medium comprising:

a transparent substrate;

a first dielectric film formed on a surface of said substrate;

a magnetic film formed on a surface of said first dielectric film;

a second dielectric film formed on a surface of said magnetic film;

a metal reflective film formed on a surface of said second dielectric film;

a thickness of the first dielectric layer being between 120% to 220% of D1, where D1 is the thickness of said first dielectric film at which a measured reflectivity of said magneto-optical recording medium is at a minimum;

a thickness of said second dielectric film being between 80% and 120% of D2, where D2 is the thickness of said second dielectric film at which a measured Kerr rotation angle of said magneto-optical recording medium is at a maximum;

the first dielectric film having a lower refractive index than that of the second dielectric film;

wherein the refractive indices $n_s$, $n_I$, $n_r$, $n_{II}$, and $n_m$ of the transparent substrate, the first dielectric film, the magnetic film, the second dielectric film, and the metal reflective film, respectively, are in the following relationship:

$$n_s < n_I < n_{II} < n_r$$

and $$n_m < n_{II}$$

and the optical path length of the first dielectric film is $3/8$ to $5/8$ of the wavelength of the irradiating light and the sum total of the optical path length of the second dielectric film added to that of the magnetic film is $1/8$ to $3/8$ of the wavelength of the irradiating light.

2. A magneto-optical recording medium according to claim 1 wherein a difference in the refractive index between the magnetic film and the first dielectric film is larger than the difference in the refractive index between the magnetic film and the second dielectric film.

* * * * *